United States Patent
Kajiyama

(10) Patent No.: US 11,285,500 B2
(45) Date of Patent: Mar. 29, 2022

(54) LIQUID CONTAINER, AND ELECTROSTATIC ATOMIZING APPARATUS WITH LIQUID CONTAINER

(71) Applicant: Panasonic Intellectual Property Management Co., Ltd., Osaka (JP)

(72) Inventor: Kenichi Kajiyama, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 607 days.

(21) Appl. No.: 16/296,866

(22) Filed: Mar. 8, 2019

(65) Prior Publication Data
US 2020/0094270 A1  Mar. 26, 2020

Related U.S. Application Data

(60) Provisional application No. 62/734,257, filed on Sep. 21, 2018.

(51) Int. Cl.
*B05B 5/03* (2006.01)
*F24F 6/00* (2006.01)
(Continued)

(52) U.S. Cl.
CPC .............. *B05B 5/032* (2013.01); *B05B 5/03* (2013.01); *B05B 5/16* (2013.01); *B05B 7/0012* (2013.01);
(Continued)

(58) Field of Classification Search
CPC ..... B05B 12/004; B05B 15/65; B05B 7/0012; B64D 13/06; B64D 2013/067; F24F 6/00; F24F 6/14; F24F 2006/008; F24F 6/12
See application file for complete search history.

(56) References Cited

U.S. PATENT DOCUMENTS 1,918,128 A * 7/1933 Pfening ................ F16K 31/20
                                                137/426
5,850,976 A   12/1998 Robidoux
(Continued)

FOREIGN PATENT DOCUMENTS

CN         105857896      12/2017
DE    10 2004 014 646      7/2005
(Continued)

OTHER PUBLICATIONS

Extended European Search Report dated Sep. 24, 2019 in European Application No. 19159242.7.
(Continued)

*Primary Examiner* — Stephen Hobson
(74) *Attorney, Agent, or Firm* — Wenderoth, Lind & Ponack, L.L.P.

(57) ABSTRACT

The liquid container according to the present disclosure is a liquid container to be detachably attached to the main body portion of an apparatus. The liquid container includes a container main body, a ventilation hole, and a lid. The container main body includes an upper portion, a bottom portion, and side portions connecting the upper portion and the bottom portion. The container main body is capable of storing a liquid. The ventilation hole penetrates the upper portion of the container main body. The lid is disposed on an inner side of the container main body and, when the liquid is stored in the container main body, is capable of closing or opening the ventilation hole according to a change in a surface of the liquid. The lid includes a fulcrum positioned closer to the side portion of the container main body than to the ventilation hole. The lid is pivotable around the fulcrum with respect to the ventilation hole.

9 Claims, 12 Drawing Sheets

Figure 1:
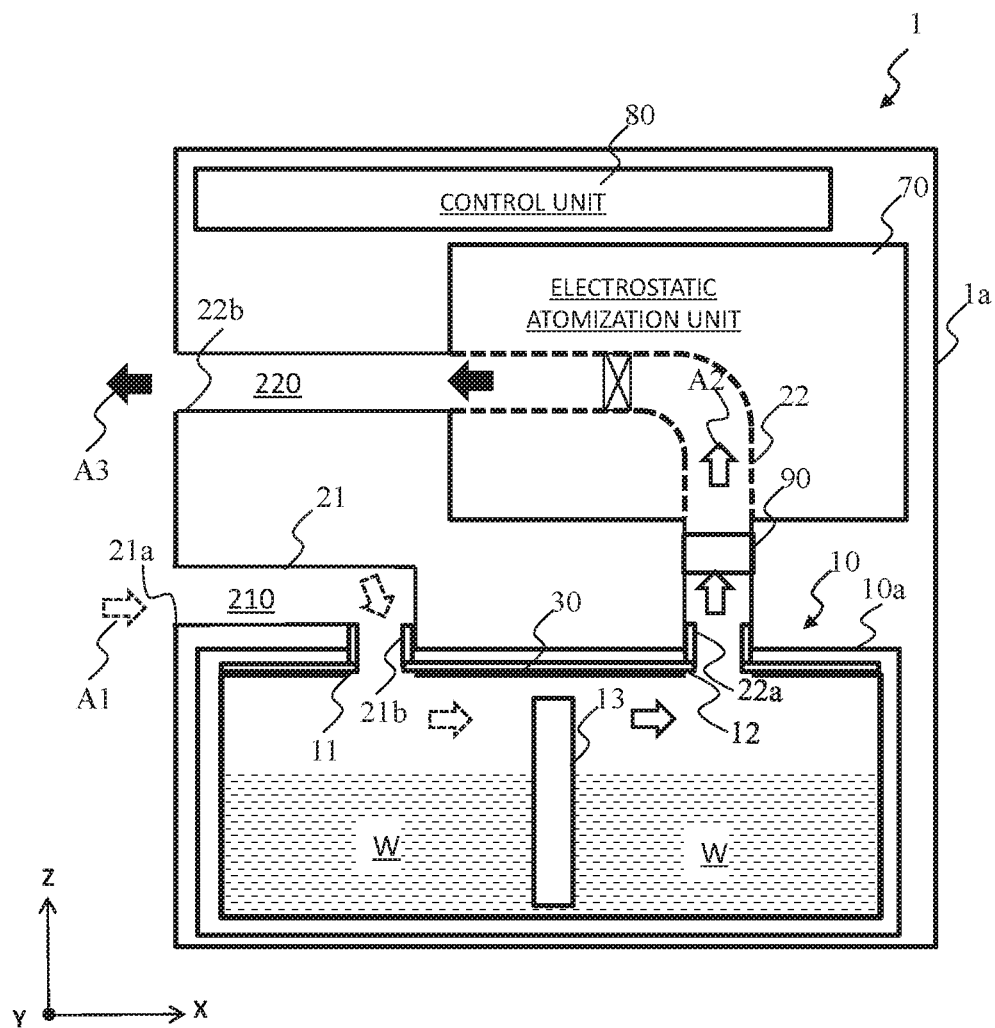

(51) Int. Cl.

| | | |
|---|---|---|
| *B05B 15/65* | (2018.01) | |
| *B05B 7/00* | (2006.01) | |
| *F24F 6/14* | (2006.01) | |
| *B05B 5/16* | (2006.01) | |
| *B05B 12/00* | (2018.01) | |
| *B64D 13/06* | (2006.01) | |

(52) U.S. Cl.
 CPC ............ *B05B 12/004* (2013.01); *B05B 15/65* (2018.02); *B64D 13/06* (2013.01); *F24F 6/00* (2013.01); *F24F 6/14* (2013.01); *B64D 2013/067* (2013.01); *F24F 2006/008* (2013.01)

(56) References Cited

U.S. PATENT DOCUMENTS

| | | |
|---|---|---|
| 9,415,412 B2 | 8/2016 | Kawashima et al. |
| 2011/0180618 A1 | 7/2011 | Schumacher et al. |

FOREIGN PATENT DOCUMENTS

| | | |
|---|---|---|
| DE | 10 2008 036 425 | 2/2010 |
| EP | 0 627 253 | 12/1994 |
| EP | 2 236 951 | 10/2010 |
| EP | 2 639 518 | 9/2013 |
| JP | 64-16991 | 1/1989 |
| JP | 5-302739 | 11/1993 |
| JP | 10-151314 | 6/1998 |
| JP | 2001-146019 | 5/2001 |
| JP | 2006-305321 | 11/2006 |
| JP | 2007-106130 | 4/2007 |
| JP | 2008-201142 | 9/2008 |
| JP | 2009-8291 | 1/2009 |
| JP | 2009-100850 | 5/2009 |
| JP | 2011-169574 | 9/2011 |
| JP | 4778276 | 9/2011 |
| JP | 2012-11093 | 1/2012 |
| JP | 4877410 | 2/2012 |
| JP | 2013-511382 | 4/2013 |
| JP | 2013-96690 | 5/2013 |
| JP | 2013-527020 | 6/2013 |
| JP | 2013-240446 | 12/2013 |
| JP | 2015-72112 | 4/2015 |
| JP | 2016-95115 | 5/2016 |
| JP | 2017-67303 | 4/2017 |
| WO | 2005/092155 | 10/2005 |
| WO | 2006/093190 | 9/2006 |
| WO | 2008/007704 | 1/2008 |
| WO | 2011/061479 | 5/2011 |
| WO | 2011/061480 | 5/2011 |

OTHER PUBLICATIONS

Extended European Search Report dated Sep. 18, 2019 in European Application No. 19159241.9.
Extended European Search Report dated Sep. 23, 2019 in European Application No. 19165433.4.
Office Action dated Jul. 30, 2021 in U.S. Appl. No. 16/296,847.

\* cited by examiner

LIQUID CONTAINER, AND ELECTROSTATIC ATOMIZING APPARATUS WITH LIQUID CONTAINER

CROSS-REFERENCE TO RELATED APPLICATION

This application claims benefit to U.S. provisional application No. 62/734,257, filed on Sep. 21, 2018. The entire disclosure of U.S. provisional application 62/734,257 is hereby incorporated herein by reference.

BACKGROUND

Technical Field

The present disclosure relates to a liquid container, and an electrostatic atomizing apparatus that produces charged particulate water.

Background

Humidifiers, air cleaners, and the like include containers that hold water in order to humidify air. These containers include openings though which humidified air flows.

SUMMARY

In aircraft and similar environments, vibration constantly occurs during aircraft movement and horizontal posture may by impossible to maintain at take-off and landing. As such, the water in the container may splash or waves may form, and this may lead to the water leaking out through the opening in the container. Such water leaks may cause electric leaks, short circuits, or the like in electronic devices near the container.

The present disclosure provides a liquid container that both secures the air flow path required for humidification and is effective for preventing water leakage, and an electrostatic atomizing apparatus including this liquid container.

The liquid container according to the present disclosure is a liquid container to be detachably attached to the main body portion of an apparatus. The liquid container includes a container main body, a ventilation hole, and a lid. The container main body includes an upper portion, a bottom portion, and side portions connecting the upper portion and the bottom portion. The container main body is capable of storing a liquid. The ventilation hole penetrates the upper portion of the container main body. The lid is disposed on an inner side of the container main body and, when the liquid is stored in the container main body, is capable of closing or opening the ventilation hole according to a change in a surface of the liquid. The lid includes a fulcrum positioned closer to the side portion of the container main body than to the ventilation hole. The lid is pivotable around the fulcrum with respect to the ventilation hole.

BRIEF DESCRIPTION OF DRAWINGS

FIG. 1 illustrates the basic configuration of an electrostatic atomizing apparatus according to Embodiment 1;

FIG. 2 is a plan view of a duct member according to Embodiment 1;

FIG. 3 illustrates a state in which a water container is attached to the electrostatic atomizing apparatus according to Embodiment 1;

FIG. 4 is a cross-sectional view illustrating the electrostatic atomizing apparatus of FIG. 3 from another direction;

FIG. 5 illustrates a state in which the water container is removed from the electrostatic atomizing apparatus according to Embodiment 1;

FIG. 6 is a cross-sectional view illustrating the electrostatic atomizing apparatus of FIG. 5 from another direction;

FIG. 7 illustrates a water container to be attached to an electrostatic atomizing apparatus according to Embodiment 2;

FIG. 8 is a plan view of the water container according to Embodiment 2;

FIG. 9A illustrates a lid of the water container of Embodiment 2 in an open state;

FIG. 9B illustrates the lid of the water container of Embodiment 2 in a closed state;

FIG. 10A illustrates the water container according to Embodiment 2 in a normal state;

FIG. 10B illustrates the water container according to Embodiment 2 in a tilted state;

FIG. 11 illustrates a water container according to a Modification Example of Embodiment 2; and FIG. 12 illustrates a water container according to another Modification Example of Embodiment 2.

DETAILED DESCRIPTION

Next, embodiments of the present disclosure will be described in detail while referencing the drawings. Note that, in some cases, unnecessarily detailed descriptions are foregone. For example, detailed descriptions of well-known matters and redundant descriptions of configurations and constituents that are substantially the same may be foregone.

Note that the following description and attached drawings are provided for the purpose of enabling a person skilled in the art to comprehend the present disclosure, and are not intended to limit the matters recited in the claims.

In the following description, for convenience, the Z-axis direction is referred to as the "up-down direction", the Z-axis positive side is referred to as "up", and the Z-axis negative side is referred to as "down." However, the attachment mode of the electrostatic atomizing apparatus 1 is not limited thereto and various attachment modes are possible. Unless otherwise stated, the Z-axis negative direction may not indicate the direction of gravity.

In the following embodiments, the term "electrostatic atomization" means cooling a water application electrode and causing the water in the air to condensate on the water application electrode to produce charged particulate water. There are two types of water application electrodes, namely a direct type and an electrode cooling type that does not require water to be supplied. In the following description of the embodiments, an electrode cooling type electrostatic atomizing method is used.

1. Embodiment 1

1-1 Configuration 1-1-1 Configuration of Electrostatic Atomizing Apparatus 1

As illustrated in FIG. 1, the electrostatic atomizing apparatus 1 (example of the apparatus) includes a main body portion 1*a*, a water container 10, a first air flow path 210, a second air flow path 220, a duct member 30, an electrostatic atomization unit 70, a control unit 80, and a fan 90. The electrostatic atomizing apparatus 1 further includes a container detachment mechanism 50 (described later).

The main body portion 1a (example of the main body portion) is a housing and accommodates the water container 10, the first air flow path 210, the second air flow path 220, the electrostatic atomization unit 70, the control unit 80, and the fan 90.

The water container 10, includes a container main body 10a that holds water. The water container 10 includes a first ventilation hole 11 and a second ventilation hole 12 in a top surface (surface on the Z-axis positive side) of the container main body 10a. The first ventilation hole 11 (example of the ventilation hole) forms a path for introducing non-humidified air into the container main body 10a. The second ventilation hole 12 (example of the ventilation hole) forms a path for sending humidified air from the container main body 10a to the electrostatic atomization unit 70. The first ventilation hole 11 for introducing air and the second ventilation hole 12 for sending air are located at two locations in an upper portion 101 (FIG. 3) of the container main body 10a. The ventilation holes 11 and 12 are open in the same direction. The ventilation holes 11 and 12 are located in the upper portion 101 of the container main body 10a so that the water W in the container main body 10a does not spill. Additionally, the ventilation holes 11 and 12 are formed sufficiently small so that the water W in the container main body 10a does not spill. In one example, the size of the ventilation holes 11 and 12 is from 0.1 cm$^2$ to 2 cm$^2$. A configuration is possible in which the ventilation holes 11 and 12 are each formed from a plurality of small holes.

Moreover, the upper portion 101 of the container main body 10a may be implemented as a sealable lid. A user can remove the water container 10 from the electrostatic atomizing apparatus 1 and open the upper portion 101 of the container main body 10a when replenishing the water W in the container main body 10a.

The first ventilation hole 11 and the second ventilation hole 12 are open in the same direction and are provided in the top side of the container main body 10a. As a result of this configuration, the risk of water splashing in the aircraft, which constantly vibrates and has difficulty maintaining a horizontal posture, is reduced.

The water container 10 further includes a humidification filter 13 in the container main body 10a. The humidification filter 13 is erected (in the middle in the X-axis direction) between the first ventilation hole 11 and the second ventilation hole 12. Due to this arrangement, the humidification filter 13 is able to efficiently supply water to the low humidity air that is introduced from outside, and high humidity air can be produced.

The humidification filter 13 humidifies low humidity air that flows through the first ventilation hole. In one example, the humidification filter 13 is a corrugated humidification filter that absorbs and holds the water held in the container main body 10*a*. In this state, low humidity air is passed through the gaps in the humidification filter 13 and, as a result, the water vaporizes from the surfaces in the humidification filter 13, the air is humidified, and high humidification air is produced. Note that the humidification filter 13 has flame retardant characteristics and is less likely to burn in the event of a fire in the aircraft, for example. The humidification filter 13 may also have corrosion resistance characteristics. Since the water W evaporates from the surface portions of the humidification filter 13 and at least the required humidity is maintained, continuous electrostatic atomization during long flights is possible.

Note that configurations are possible in which a different humidification device is provided in place of the humidification filter 13. For example, a vibration-type humidifier or a heating-type humidifier may be used.

The first air flow path 210 extends from a first end, namely an air suction port 21*a*, to a second end 21*b* that connects to the first ventilation hole 11 of the water container 10. The first air flow path 210 suctions air through the air suction port 21*a* in accordance with the air flow generated by the fan 90, and sends the air to the first ventilation hole 11 of the water container 10. This suctioned air is low humidity air A1 that is insufficient for condensation water production.

The second air flow path 220 extends from a third end 22*a* that connects to the second ventilation hole 12 of the water container 10 to a fourth end, namely an air exhaust port 22*b*. The second air flow path 220 sends the air A2 that was humidified in the water container 10 from the second ventilation hole 12 to the electrostatic atomization unit 70 in accordance with the air flow generated by the fan 90. Furthermore, the second air flow path 220 sends the air A3 that contains charged particulate water produced by the electrostatic atomization unit 70 to the air exhaust port 22*b*, and discharges the air A3 out of the apparatus.

As illustrated in FIG. 2, the duct member 30 is an integrally molded part, and includes a first duct 31 and a second duct 32. The first duct 31 connects to the main body portion 1*a* and the first ventilation hole 11 of the water container 10. The first duct 31 forms a portion of the first air flow path 210. The second duct 32 connects to the main body portion 1*a* and the second ventilation hole 12 of water container 10. The second duct 32 forms a portion of the second air flow path 220. As illustrated in FIGS. 3 and 5, the first duct 31 and the second duct 32 respectively include open ends 31*a* and 32*a*. The open ends 31*a* and 32*a* each have a hook-shaped cross-section. The open ends 31*a* and 32*a* respectively include abutting surfaces 31*b* and 32*b* that face the side of the water container 10 that is attached to the main body portion 1*a*. The abutting surfaces 31*b* and 32*b* abut against step portions formed in corresponding portions of the main body portion 1*a*. Specifically, a configuration is provided in which the surfaces of the duct member 30 and the main body portion 1*a* abut against each other in a direction crossing or in a direction substantially orthogonal to the air flow direction. Due to this configuration, a structure can be formed in which the water W in the water container 10 is less likely to leak from the boundary portion between the duct member 30 and the main body portion 1*a*.

The electrostatic atomization unit 70 (example of the electrostatic atomization unit) is disposed on the second air flow path 220. As is commonly known, the electrostatic atomization unit 70 includes, for example, a cooler, a water application electrode, and a counter electrode (all not illustrated in the drawings). High voltage is applied to the water application electrode and the counter electrode, and the cooler cools the water application electrode. As a result, the water in the high humidity air A2 condensates on the electrode and charged particulate water is produced. Air A3 that contains the charged particulate water is discharged out of the apparatus through the air exhaust port 22*b*.

The control unit 80 includes, for example, a processor such as a central processing unit (CPU). The control unit 80 controls the operations of the electrostatic atomization unit 70, the fan 90 (described later), and the like in accordance with a program stored in memory.

The fan 90 (example of the air flow generation unit) generates an air flow that causes air to flow through the first air flow path 210, through the container 10, and through the second air flow path 220. Due to the operation of the fan 90, the air is sent sequentially from the air suction port 21*a* to the first air flow path 210, the water container 10, the electrostatic atomization unit 70, and the exhaust port 22b. Note that the fan 90 is not limited to being disposed at the position illustrated in FIG. 1. For example, the fan 90 may be disposed at a position near the air suction port 31a, or may be disposed at a position before the air exhaust port 22b. Moreover, the air flow generation device is not limited to the fan 90, and other devices and methods that generate an air flow may be used.

1-1-2 Configuration of Container Detachment Mechanism

Various equipment is installed in the aircraft, and space is limited. Among this equipment, there may be electronic devices that could fail due to drops of water that adhere as a result of water intrusion or submersion. The electrostatic atomizing apparatus 1 of the present disclosure is a device that handles water, and the water is replenished regularly. As such, the water container 10 has a structure that enables the water container 10 to be detached from the main body portion 1a of the electrostatic atomizing apparatus 1. When the water container 10 is to be removed from or attached to the main body portion 1a, the water container 10 is cut off from the duct member 30. Consequently, there is a possibility of the water W in the water container 10 leaking out.

The electrostatic atomizing apparatus 1 according to the present disclosure includes the container detachment mechanism 50 illustrated in FIGS. 3 to 6 and described below and, as such, water leakage is less likely to occur when attaching and detaching the water container 10.

The container detachment mechanism 50 moves the duct member 30 up and down with respect to the water container 10 and, when the water container 10 is attached to the main body portion 1a, creates a state in which the duct member 30 is in pressure contact with the water container 10. Specifically, as illustrated in FIGS. 3 to 6, the container detachment mechanism 50 includes a spring 51 disposed between the main body portion 1a and the duct member 30, a protrusion 35 formed on the lower portion of the duct member 30, and a recess 15 formed in the upper portion 101 of the container main body 10a.

Figure 2:
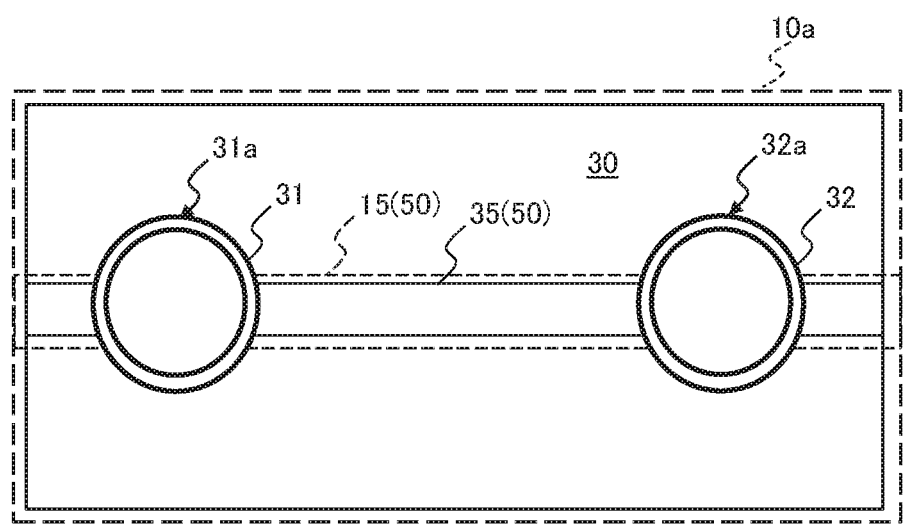
Figure 2:
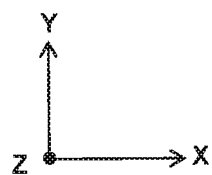
Figure 3:
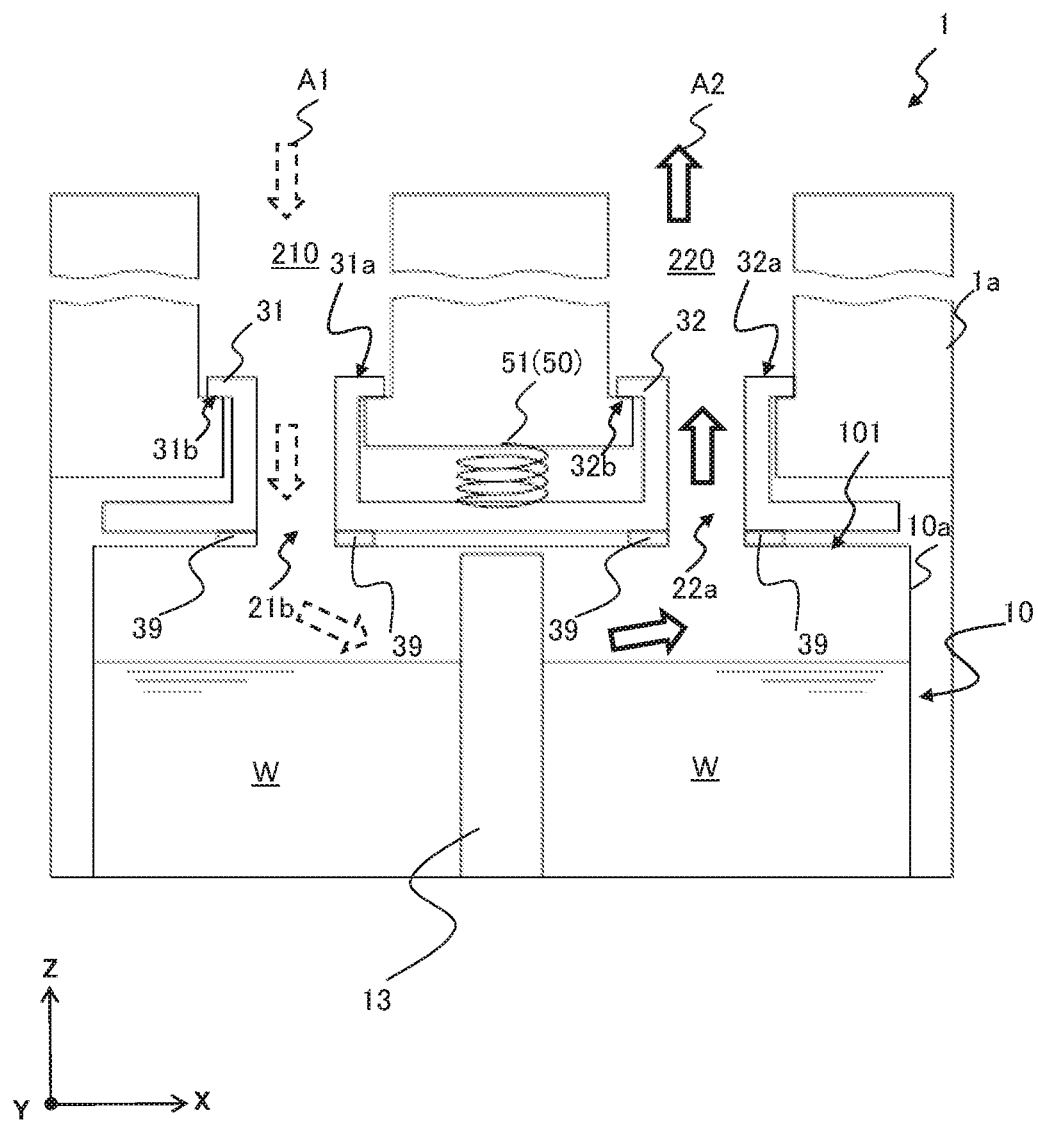
Figure 4:
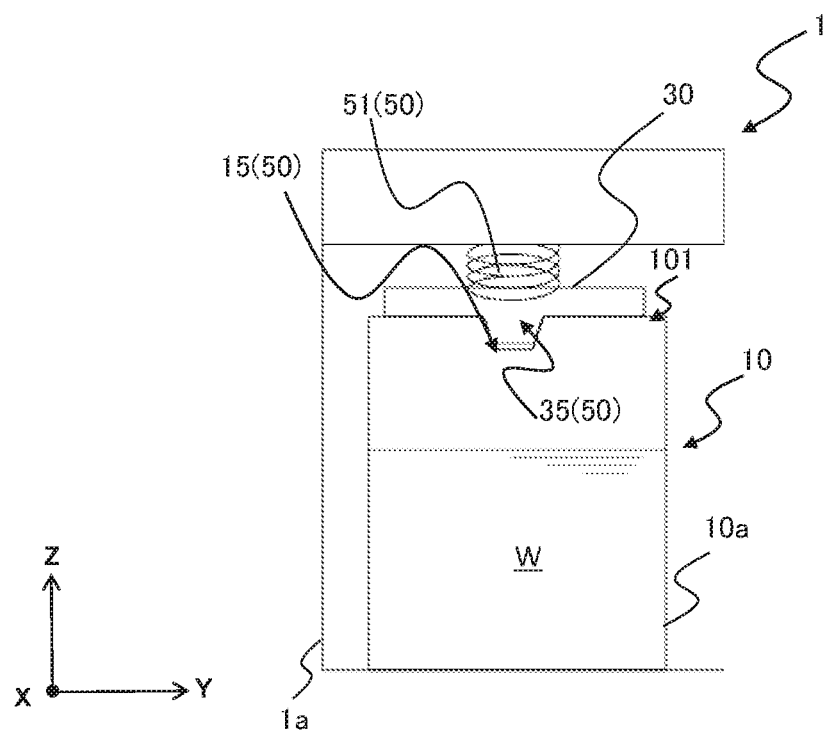
Figure 5:
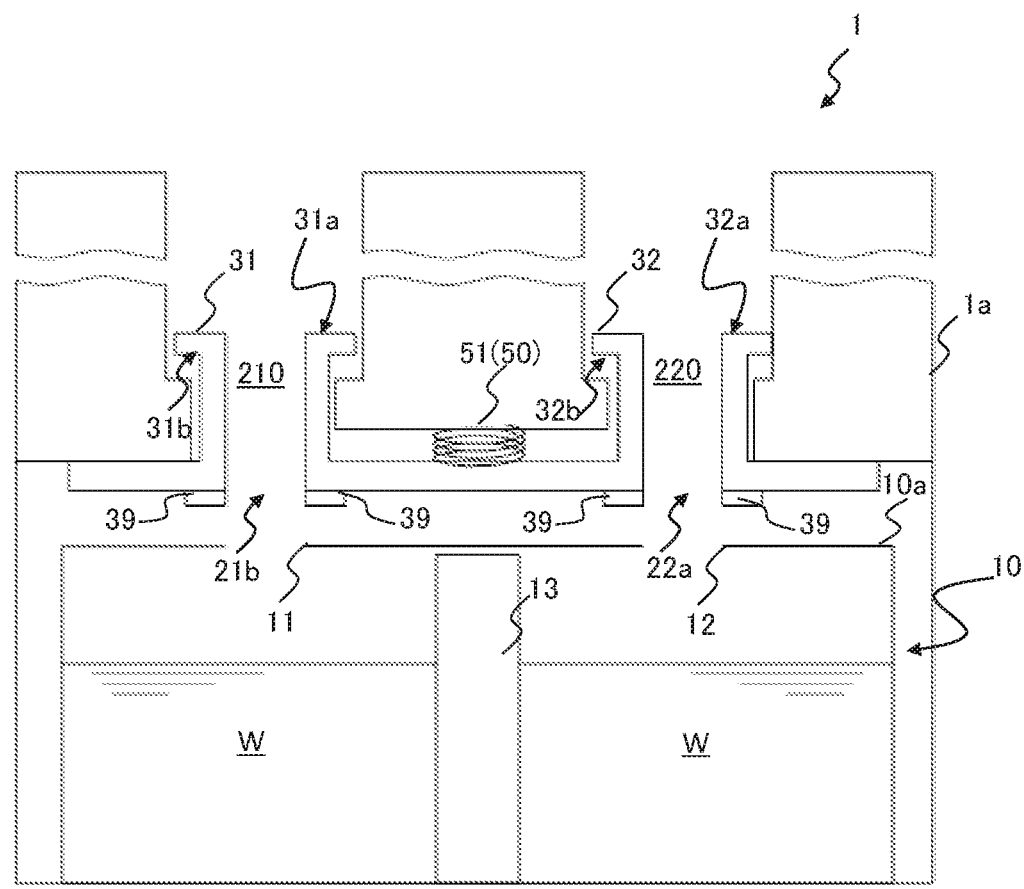
Figure 6:
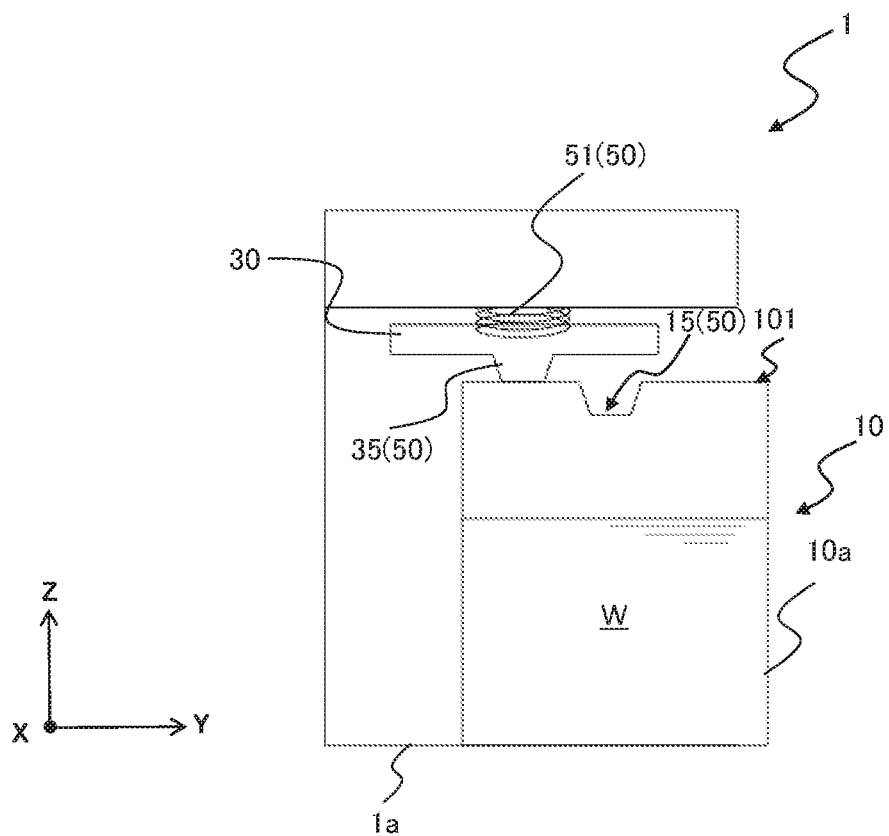
Figure 7:
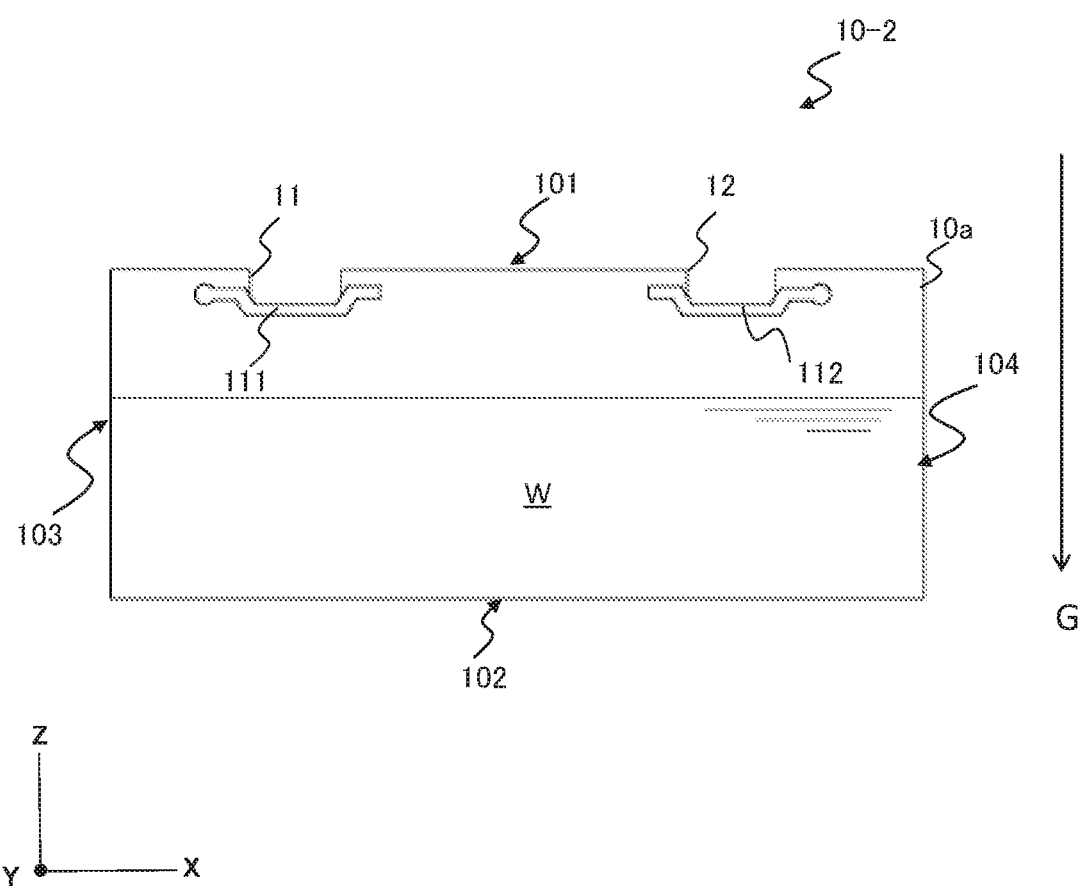
Figure 8:
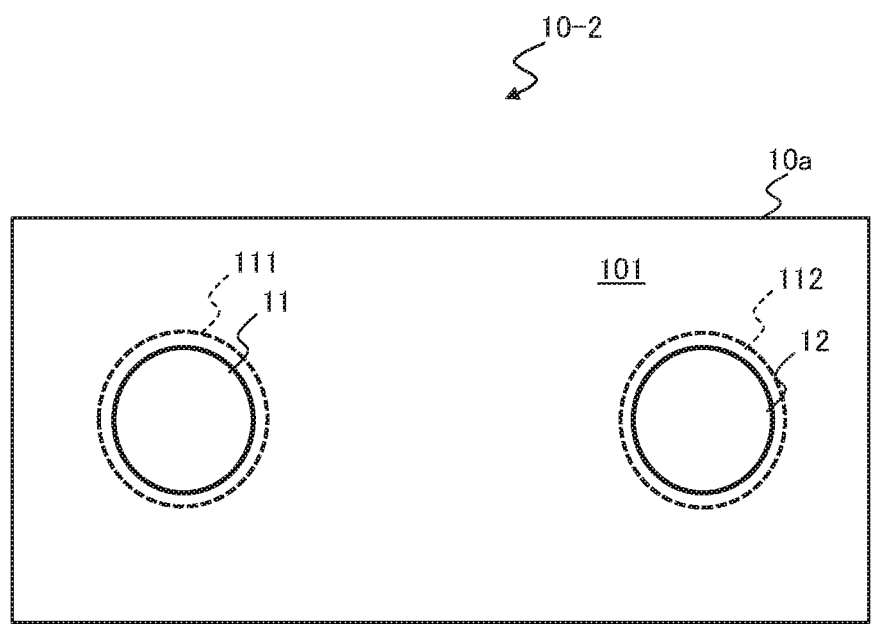
Figure 8:
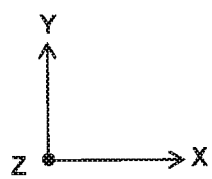

FIGS. 3 and 4 illustrate a state in which the water container 10 is mounted on the main body portion 1a, that is, a state in which the electrostatic atomizing apparatus 1 is operable. FIG. 4 illustrates a YZ cross-section of the water container 10 depicted in FIG. 3. The spring 51 has urging force that acts toward the water container 10 side, that is, that acts in the Z-axis negative direction. As illustrated in FIG. 4, the protrusion 35 protrudes from the lower (Z-axis negative side) surface of the duct member 30. The recess 15 is formed in the upper portion 101 of the container main body 10a and is concave in the Z-axis negative direction. As illustrated in FIG. 2, the protrusion 35 and the recess 15 are formed long in the X-axis direction along the longitudinal direction of the container main body 10a. While the water container 10 is mounted on the main body portion 1a, the protrusion 35 is housed in and engaged with the recess 15. At this time, the spring 51 is in a state compressed in the Z-axis positive direction, against the urging force. Due to the urging force of the spring 51, the duct member 30 and the water container 10 are brought into close contact with each other, and the protrusion 35 engages with the recess 15. As a result, displacement of the water container 10 is less likely to occur, even in the case of a degree of vibration. Thus, water leakage such as that caused by the water container 10 being removed from the duct member 30 can be prevented.

Note that a configuration is possible in which a recess is provided in the duct member 30 and a protrusion is provided on the water container 10 side.

A cushion material 39 is disposed between the duct member 30 and the water container 10. The cushion material 39 is disposed between the first duct 31 and the surroundings of the first ventilation hole 11, and between the second duct 32 and the surroundings of the second ventilation hole 12. The cushion material 39 improves the adhesion of the water container 10 to the duct member 30 and, as a result water leakage can be effectively prevented.

1-2 Operations 1-2-1 Operations of Electrostatic Atomizing Apparatus

In an electrostatic atomizing method using the electrostatic atomizing apparatus 1 according to Embodiment 1, as illustrated in FIG. 1, the air A1 suctioned through the air suction port 21a by the air flow generated by the fan 90 flows through the first air flow path 210 and is introduced into the water container 10 in which the water W is stored. The air A1 is humidified as a result of passing through the water container 10. The humidified air A2 is exhausted from the water container 10. In the electrostatic atomization unit 70, charged particulate water is produced by causing water in the humidified air A2 to condensate on an electrode and applying voltage to the electrode. The air A3 that contains the charged particulate water is exhausted through the air exhaust port 22*b*.

1-2-2 Detachment Operation of Container Detachment Mechanism

FIGS. 5 and 6 illustrate a state when the water container 10 is removed from the main body portion 1*a*, that is, a state in which the electrostatic atomizing apparatus 1 is not operating. In FIG. 6, when the water container 10 is pulled in the Y-axis positive direction, the protrusion 35 of the duct member 30 separates from the recess 15 in the top surface of the container main body 10*a*, and becomes seated on a flat portion of the top surface that is not recessed. As a result, the duct member 30 is pressed in the Z-axis positive direction and presses the spring 51 up. As a result, the spring 51 compressed further against the urging force. When the water container 10 is further pulled in the Y-axis positive direction, the water container 10 separates from the duct member 30 and can be removed from the main body portion 1*a*. When the water container 10 is removed, the duct member 30 moves in the Z-axis negative direction due to the urging force of the spring 51 or the weight of the duct member 30 itself. After the water W in the removed water container 10 has been replenished, the water container 10 is attached to the main body portion 1*a*. As illustrated in FIG. 6, at this time, when the water container 10 is pressed in the Y-axis negative direction, the duct member 30 is pressed up and becomes seated on the top surface of the container main body 10*a* against the urging force of the spring 51. When the water container 10 is pressed further in the Y-axis negative direction, the protrusion 35 mates with the recess 15. Thus, the water container 10 is attached to the main body portion 1*a* as illustrated in FIGS. 3 and 4.

1-3 Features

In low humidity environments such as in the cabins of aircraft flying at high altitudes, the humidity required to produce condensation water cannot be reached and, thus, it is not possible to obtain condensation water. Alternatively, the condensation water freezes due to intense cooling on the endothermic surface and, thus, it is not possible to obtain condensation water. This leads to the problem of not being able to perform electrostatic atomization.

The electrostatic atomizing apparatus 1 or the electrostatic atomizing method according to Embodiment 1 causes the low humidity air A1 suctioned through the air suction port 21a to pass through the water container 10, thereby humidifying the air A1, causes the humidified air A2 to pass through the electrostatic atomization unit 70, and exhausts the air A3 containing the charged particulate water. As such, even if the outside air that is taken in is low humidity air, humidified air can be constantly delivered to the electrostatic atomization unit 70. This, the condensation water necessary for electrostatic atomization can be produced, and electrostatic atomization can be performed even in low humidity environments.

The electrostatic atomizing apparatus 1 according to Embodiment 1 includes the duct member 30 and the container detachment mechanism 50. The duct member 30 includes the first duct 31 that connects to the first ventilation hole 11 and that forms a portion of the first air flow path 210, and the second duct 32 that connects to the second ventilation hole 12 and that forms a portion of the second air flow path 220. The container detachment mechanism 50 presses the duct member 30 against the water container 10 that is attached to the main body portion 1*a*. As a result of this configuration, water leakage from the water container 10 can be prevented in cases in which, during the operation of the electrostatic atomizing apparatus 1, vibration occurs or the aircraft cannot maintain a horizontal posture such as during take-off and landing. Moreover, since the duct member 30 can be moved up and down, the water container 10 is easier to attach and detach.

With the electrostatic atomizing apparatus 1 or the electrostatic atomizing method according to Embodiment 1, for a 24 hour flight, it is possible to perform electrostatic atomization with 100 ml or less of water. This is because only the insufficient portion of the necessary water is replenished, based on the humidity contained in the air. Thus, the amount of water can be reduced compared to the direct water supply electrostatic atomization as disclosed in Japanese Patent No. 4877410.

In the electrostatic atomizing apparatus 1 according to Embodiment 1, the various electronic devices such as the electrostatic atomization unit 70, the control unit 80, and the fan 90 can be disposed upward from the water container 10. As a result of this configuration, even if water leakage occurs, water is less likely to enter into the electrostatic atomizing apparatus 1, and therefore, it is possible to reduce the risk of electric leaks, short circuits, and the like.

2. Embodiment 2

In Embodiment 2, a water container 10-2 that is detachable from the electrostatic atomizing apparatus 1 differs from the water container 10 of Embodiment 1 in that the water container 10-2 includes lids 111 and 112. In the following, the structure and functions of the water container 10-2 that differ from Embodiment 1 are primarily described while referencing FIGS. 7 to 10. Note that constituents that have the same structures and functions as in Embodiment 1 are marked with the same reference numerals. The arrow G illustrated in the drawings indicates the direction of gravity.

2-1 Configuration

As illustrated in FIG. 7, the water container 10-2 (example of the liquid container) includes a container main body 10*a* that holds water W. As in Embodiment 1, the container main body 10*a* includes an upper portion 101, a bottom portion 102, and left and right container side portions 103 and 104 that connect the upper portion 101 and the bottom portion 102. The water container 10-2 includes a first ventilation hole 11 and a second ventilation hole 12 that penetrate the upper portion 101 of the container main body 10*a*.

As illustrated in FIG. 7, the water container 10-2 includes a first lid 111 and a second lid 112. As illustrated in FIG. 8, when viewed planarly, the first lid 111 (example of the lid) and the second lid 112 (example of the lid) have round shapes. As a result of this configuration, the first lid 111 and the second lid 112 can close the first ventilation hole 11 and the second ventilation hole 12, respectively. It is sufficient that the planar shapes of the first lid 111 and the second lid 112 match the shapes of the ventilation holes 11 and 12. The first lid 111 closes the first ventilation hole 11 due to a change in the surface of the water W when water is stored in the container main body 10*a*. The second lid 112 closes the second ventilation hole 12 due to a change in the surface of the water W when water is stored in the container main body 10*a*.

As illustrated in FIGS. 10A and 10B, the first lid 111 includes a fulcrum 111*a* that is closer to the container side portion 103 than the first ventilation hole 11, and the first lid 111 is pivotable around the fulcrum 111*a* with respect to the first ventilation hole 11. Likewise, the second lid 112 has a fulcrum 112*a* that is closer to the container side portion 104 than the second ventilation hole 12, and the second lid 112 is pivotable around the fulcrum 112*a* with respect to the second ventilation hole 12. The first lid 111 and the second lid 112 respectively include fulcrums that are closer to the container side portions 103 and 104, and open and close toward the center of the container main body 10*a*.

The first lid 111 and the second lid 112 are formed from a material with a smaller specific gravity than the water W. For example, the first lid 111 and the second lid 112 are formed from a resin material or the like that has a lower density than the water W.

As illustrated in FIGS. 9A and 9B, a rim surrounding the first ventilation hole 11 of the container main body 10*a* includes a protruding edge portion 11*c* that protrudes more toward the surface of the water W than an inside surface 101*a* of the upper portion 101 of the container main body 10*a*. The first lid 111 includes a recess 111*c* that accommodates the protruding edge portion 11*c* when the first ventilation hole 11 is closed, and an extended portion 111*e* that extends outward from the recess 111*c*. The extended portion 111*e* includes an abutting surface 111*f* that is capable of abutting against an inside surface 101*a* of the upper portion 101 of the container main body 10*a* when the first lid 111 closes the first ventilation hole 11. As illustrated in FIG. 9B, since the abutting surface 111*f* abuts against the upper portion 101 of the container main body 10*a*, the first lid 111 can effectively close the first ventilation hole 11. The second lid 112 has the same configuration as the first lid 111, and a protruding edge portion that is the same as the protruding edge portion 11*c* is formed on the rim surrounding the second ventilation hole 12 of the container main body 10*a*. As such, description thereof is foregone.

2-2 Operations

FIG. 10A illustrates the water container 10-2 in a normal state, that is, when installed horizontally. At this time, the first lid 111 pivots about the fulcrum 111*a* in the opening direction due to the weight of the first lid 111, and the portion of the first lid 111 contacting the surface of the water W floats on the water surface. Likewise, the second lid 112 pivots about the fulcrum 112*a* in the opening direction due to the weight of the second lid 112, and the portion of the second lid 112 contacting the surface of the water W floats on the water surface.

Figure 9A:
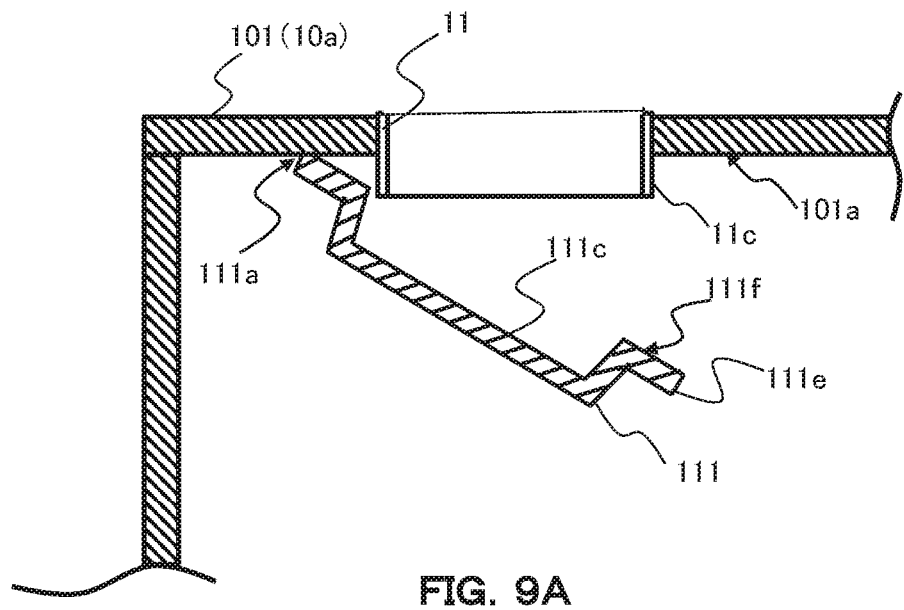
Figure 9B:
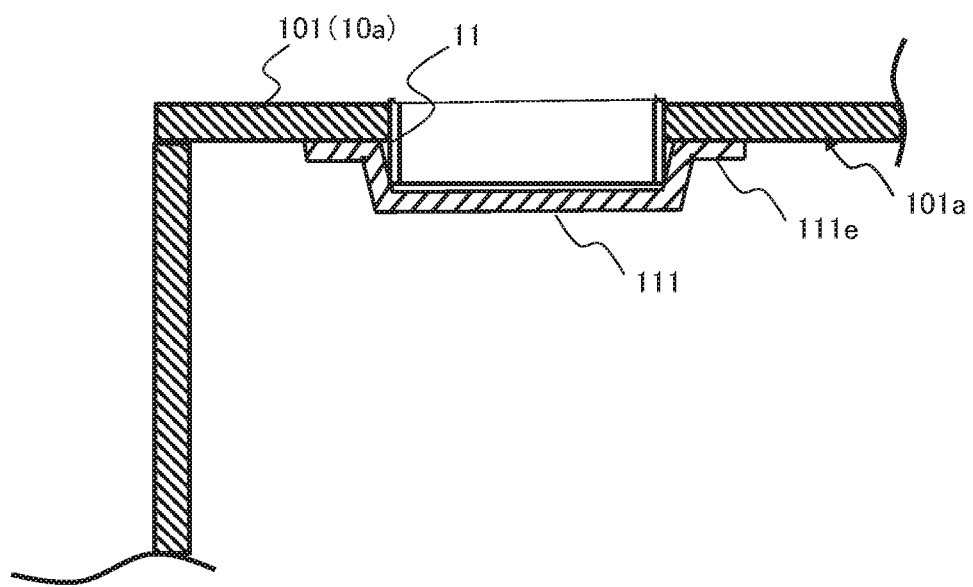
Figure 10A:
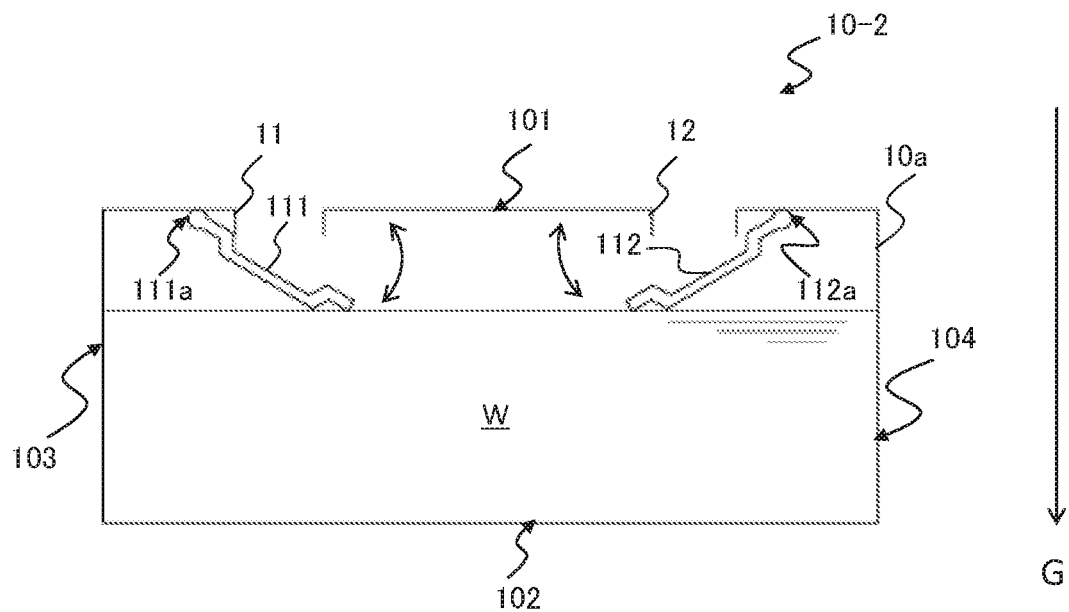
Figure 10B:
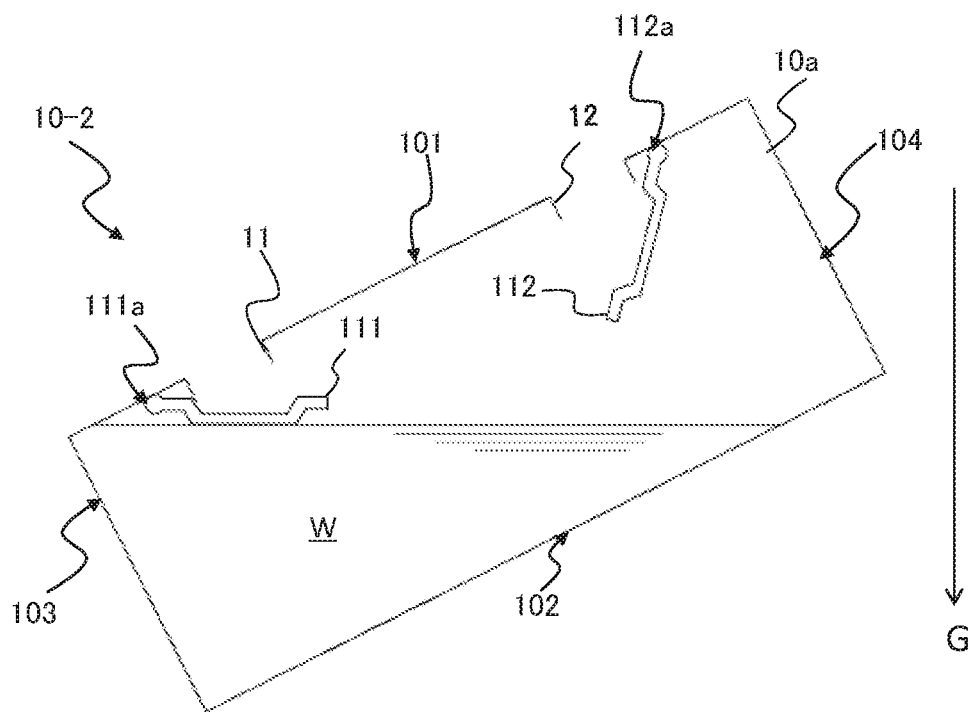

FIG. 10B illustrates the water container 10-2 in a state tilted to the side portion 103 side. At this time, the water W is also tilted to the side portion 103 side and, as such, the surface of the water W rises on the side portion 103 side. As a result, due to the buoyant force of the water W, the first lid 111 is pressed, and the first lid 111 pivots in the direction of closing the first ventilation hole 11. In cases in which the water container 10 is tilted further, the first ventilation hole 11 is closed before the water surface reaches the first ventilation hole 11, as illustrated in FIG. 9B. Meanwhile, since second lid 112 is no longer subjected to the buoyant force of the water W due to the water surface lowering, the second lid 112 is in an open state.

In cases in which the water container 10-2 tilts to the side portion 104 side, opposite to the behavior described above, the second lid 112 pivots in the closing direction, and the first lid 111 pivots in the opening direction.

2-3 Features

In aircraft and the like, vibration constantly occurs during movement and horizontal posture may by impossible to maintain at take-off and landing. As such, the water container 10-2 attached to the electrostatic atomizing apparatus 1 tilts, the water W waves or splashes, and the like. As a result, the surface of the stored water W changes, and there is a possibility of the water W leaking out through the ventilation holes 11 and 12 of the water container 10-2. This leakage may lead to electric leaks, short circuits, and the like in the electrostatic atomizing apparatus 1.

However, as described in Embodiment, the ventilation holes 11 and 12 of the water container 10-2 are air flow paths and, as such, must remain open during the operation of the electrostatic atomizing apparatus 1.

The water container 10-2 according to Embodiment 2 includes the lids 111 and 112 that are capable of closing or opening the ventilation holes 11 and 12 according to changes in the surface of the water W. The lids 111 and 112 have the fulcrums 111*a* and 112*a* that are closer to the container side portions 103 and 104 than to the ventilation holes 11 and 12, and the lids 111 and 112 are pivotable around the fulcrums 111*a* and 112*a* with respect to the ventilation holes 11 and 12.

Thus, a configuration is provided in which the surface of the water W does not rise higher than the lids 111 and 112, and the ventilation holes 11 and 12 are closed by the lids 111 and 112 before the water surface reaches the ventilation holes 11 and 12. Thus, it is possible to prevent the water W from leaking out through the ventilation holes 11 and 12 of the water container 10-2, and it is possible to reduce the risk of electric leaks, short circuits, and the like in the electrostatic atomizing apparatus 1. Meanwhile, since the lids 111 and 112 are open in the normal state, the water container 10-2 can secure the air flow path for electrostatic atomization.

Additionally, the electrostatic atomizing apparatus 1 according to Embodiment 2 has a structure that reduces the possibility of water leakage. As such, in aircraft environments where there is a plurality of electrical equipment in neighboring areas, it is possible to reduce the risk of the occurrence of electric leaks, short circuits, and the like and improve safety.

2-4 Modification Examples

Figure 11:
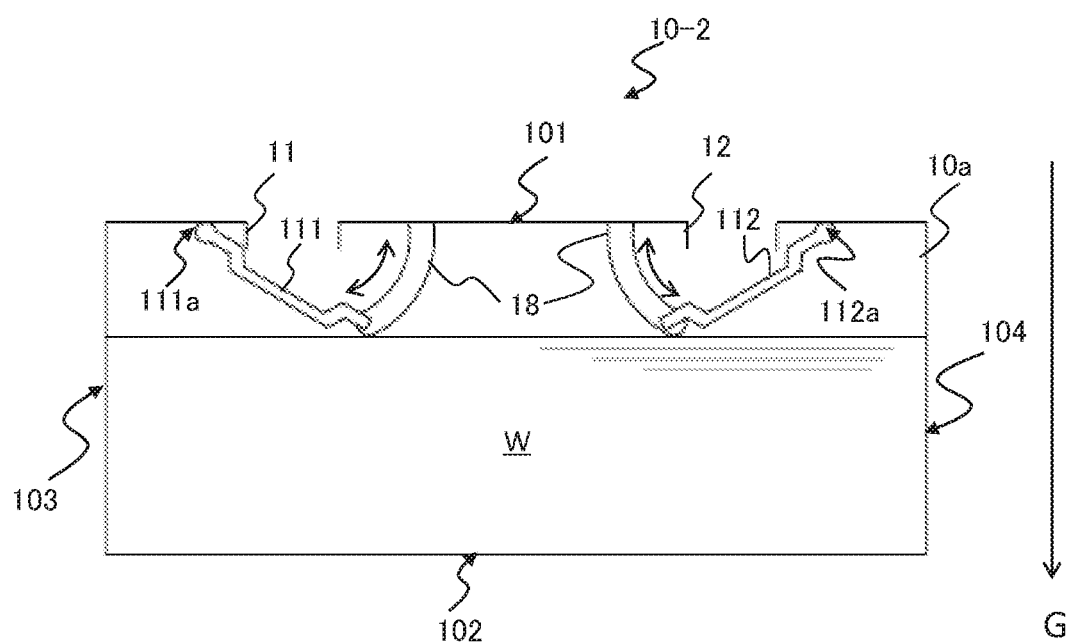

As illustrated in FIG. 11, a configuration is possible in which the water container 10-2 includes guides 18 that guide, in accordance with the pivoting of the first lid 111 and the second lid 112, the ends on the sides of the first lid 111 and the second lid 112 opposite the fulcrums 111*a* and 112*a*. As a result of this configuration, the opening and closing operations of the first lid 111 and the second lid 112 can be more easily controlled, and smooth opening and closing operations can be performed.

Figure 12:
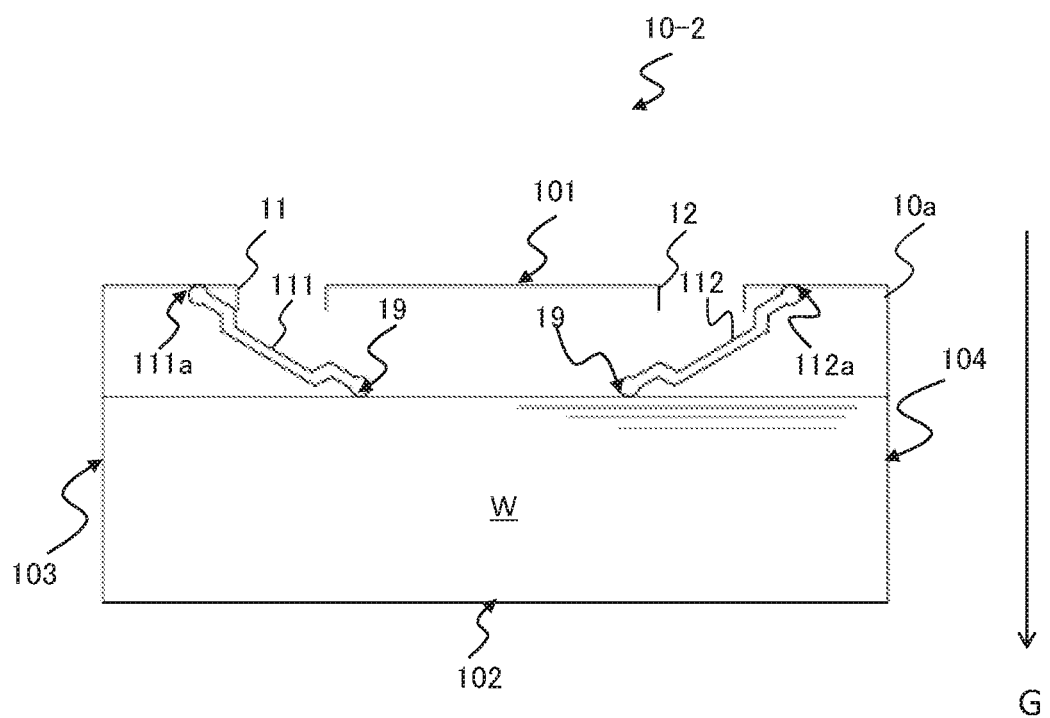

As illustrated in FIG. 12, a configuration is possible in which the first lid 111 and the second lid 112 include an expanded portion 19 on the ends of the sides of the first lid 111 and the second lid 112 opposite the fulcrums 111*a* and 112*a*. As a result of this configuration, the first lid 111 and the second lid 112 will be more easily subjected to the buoyant force of the water W and, as such, the water W can be effectively prevented from flowing above the lids 111 and 112.

3. Other Embodiments

The embodiments described above have been given as examples of the technology that is disclosed in the present application. However, the technology according to the present disclosure is not limited thereto, and changes, substitutions, additions, and omissions can be applied to the embodiments. Moreover, the constituents described in the embodiments may be combined to create new embodiments.

(1) In the embodiments described above, the shapes of the water container 10 or 10-2, the ventilation holes 11 and 12, and the other constituents are not limited to the shapes illustrated in the drawings. For example, a configuration is possible in which the container main body 10*a* has a shape other that a rectangular solid or a cube. For example, the container main body 10*a* may have a rounded shape. The shapes of the ventilation holes 11 and 12 are not limited to circular, and may be square, rectangular, or the like.

In the embodiments described above, the number of the ventilation holes 11 and 12 of the water container 10 or 10-2 is not limited. The numbers of the ventilation holes 11 and 12 may be one or may be three or more.

(2) In the embodiments described above, the liquid stored in the water container 10 or 10-2 is not limited to the water W. Any other liquid that can be evaporated may be used.

(3) In the embodiments described above, a water absorbing member may be provided in the water container 10 or 10-2. The water absorbing member is, for example, a mass of absorbent cotton, a water absorbing polymer, or the like, and is disposed in the container main body 10*a*. The water absorbing member prevents the water from moving freely as a liquid. As a result of this configuration, the water is prevented from splashing in and leaking out of the electrostatic atomizing apparatus 1, even at take-off and landing of the aircraft or when the aircraft vibrates. However, if the water absorbing member absorbs too much of the water and the water cannot be supplied to the humidification filter 13, humidification will not be possible. Therefore, it is preferable that the size and water holding characteristics of the water absorbing member be set so that a degree of water can be supplied instead of the water being completely absorbed and retained.

(4) In the embodiments described above, the duct member 30 is implemented as an integrally molded part, but is not limited thereto. For example, a configuration is possible in which the first duct 31 and the second duct 32 are attached to the main body portion 1a as separate components. Additionally, a configuration is possible in which the duct member 30 is not disposed and, for example, a structure is provided in which pipe portions, formed by extending rim portions of the ventilation holes 11 and 12 of the water container 10 or 10-2, are directly attached to the air flow paths of the main body portion 1a. Alternatively, a structure may be provided in which pipes, formed by extending rim portions of the second end 21b and the third end 22a of the air flow paths of the main body portion 1a, are directly attached to the ventilation holes 11 and 12 of the water container 10 or 10-2.

(5) The structure for preventing water leakage while the water container 10 or 10-2 is removed from the electrostatic atomizing apparatus 1 is not limited to that described in the embodiments described above. For example, a configuration is possible in which a cap, a check valve, or a selective membrane that is gas-permeable (including water vapor), but not liquid-permeable, is provided at the connecting portion between the main body portion 1a (or the duct member 30) and the water container 10 or 10-2.

(6) The water W stored in the water container 10 or 10-2 may corrode when exposed to air for an extended period of time. The duct member 30 may have a removable structure that accompanies the removal of the water container 10 or 10-2 and/or the humidification filter 13. As a result of this configuration, not only the water container 10 or 10-2, but also the duct member 30 to which corroded water has adhered can be replaced, and an odor-free and corrosion-free state can be maintained. Additionally, the removed water container 10 or 10-2 and the duct member 30 may be cleaned and reused/reinstalled. In this case, the removed water container 10 or 10-2 and the duct member 30 can be used repeatedly, and costs associated with facilities and equipment can be reduced.

Additionally, a configuration is possible in which the container main body 10a of the water container 10 or 10-2, the humidification filter 13, and the duct member 30 are individually removed and replaced or disposed of at different times.

(7) In the embodiments described above, an example is described that focuses on an aircraft as the space in which the electrostatic atomizing apparatus 1 is used, but the space in which the electrostatic atomizing apparatus 1 is used is not limited thereto. For example, the electrostatic atomizing apparatus 1 may be installed in a train, a bus, a marine vessel, or other vehicle. The electrostatic atomizing apparatus 1 or the water container 10-2 according to the embodiments described above can demonstrate the advantageous benefits described above even when used in other vehicles in which vibration occurs such as trains, marine vessels, and the like, or in spaces with low humidity environments.

(8) The water container 10 that includes the container detachment mechanism 50 and the water container 10-2 that includes the lids 111 and 112 according to the embodiments described above are not limited to being used in the electrostatic atomizing apparatus 1. The water container 10 and the water container 10-2 are usable in devices such as humidifiers or air cleaners that include a container that stores a liquid such as the water W, for example.

General Interpretation of Terms

In understanding the scope of the present disclosure, the term "configured" as used herein to describe a component, section, or a part of a device includes hardware and/or software that is constructed and/or programmed to carry out the desired function.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a device.

Terms that are expressed as "means-plus function" in the claims should include any structure that can be utilized to carry out the function of that part of the present disclosure. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed:

1. A liquid container to be detachably attached to a main body portion of an apparatus, the liquid container comprising:
   a container main body including an upper portion, a bottom portion, and side portions connecting the upper portion and the bottom portion, the container main body being capable of storing a liquid;

a ventilation hole penetrating the upper portion of the container main body; and a lid that is disposed on an inner side of the container main body and that, when the liquid is stored in the container main body, is capable of closing or opening the ventilation hole according to a change in a surface of the liquid;

the lid including a fulcrum positioned closer to the side portion of the container main body than to the ventilation hole, the lid being pivotable around the fulcrum with respect to the ventilation hole.

2. The liquid container according to claim 1, wherein the lid pivots in a direction of closing the ventilation hole as a result of the surface of the liquid rising with respect to the lid, and pivots in a direction of opening the ventilation hole as a result of the surface of the liquid lowering with respect to the lid.

3. The liquid container according to claim 1, wherein the lid has a lower specific gravity than the liquid.

4. The liquid container according to claim 1, wherein the lid includes an expanded portion on an end of a side of the lid opposite the fulcrum, the expanded portion having a specific gravity that is less than the liquid.

5. The liquid container according to claim 1, further comprising a guide for guiding an end on a side of the lid opposite the fulcrum in accordance with pivoting of the lid.

6. The liquid container according to claim 1, wherein the ventilation hole is surrounded by a rim including a protruding edge portion that protrudes farther toward the surface of the liquid than an inside surface of the upper portion of the container main body, the lid includes a recess for accommodating the protruding edge portion when the lid closes the ventilation hole, and includes an extended portion that extends outward from the recess, and the extended portion includes an abutting surface that is capable of abutting against the inside surface of the upper portion of the container main body when the lid closes the ventilation hole.

7. The liquid container according to claim 1, wherein the ventilation hole includes a first ventilation hole and a second ventilation hole that are open in a same direction, the lid includes a first lid and a second lid, the first lid is capable of closing the first ventilation hole according to the change in the surface of the liquid when the liquid is stored in the container main body, and the second lid is capable of closing the second ventilation hole according to the change in the surface of the liquid when the liquid is stored in the container main body.

8. An electrostatic atomizing apparatus, comprising:

the liquid container according to claim 1;

a main body portion of the apparatus, the liquid container being detachable from the main body portion; and an electrostatic atomization unit mounted to the main body portion.

9. The electrostatic atomizing apparatus according to claim 8, wherein the ventilation hole includes a first ventilation hole and a second ventilation hole that are open in a same direction, the lid includes a first lid and a second lid, the first lid is capable of closing the first ventilation hole according to the change in the surface of the liquid when the liquid is stored in the container main body, the second lid is capable of closing the second ventilation hole according to the change in the surface of the liquid when the liquid is stored in the container main body, the apparatus includes an air flow generation unit for generating an air flow that causes air to flow from the first ventilation hole, through the container main body, and toward the second ventilation hole, and the electrostatic atomization unit is disposed downstream in the air flow with respect to the second ventilation hole.

* * * * *